United States Patent
Hobbet et al.

(10) Patent No.: US 7,106,540 B1
(45) Date of Patent: Sep. 12, 2006

(54) ENSURING RATE OF SPIN-UP/SPIN-DOWN CYCLES FOR SPINDLE MOTOR IN A HARD DISK DRIVE DOES NOT EXCEED RATE SPINDLE MOTOR IS DESIGNED TO HANDLE

(75) Inventors: Jeffrey R. Hobbet, Holly Springs, NC (US); Steve J. Livaccari, Wake Forest, NC (US); Joaquin F. Pacheco, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/145,250

(22) Filed: Jun. 3, 2005

(51) Int. Cl.
*G11B 15/46* (2006.01)
*G11B 5/596* (2006.01)

(52) U.S. Cl. .................. 360/73.03; 360/77.02
(58) Field of Classification Search ............... None
See application file for complete search history.

(56) References Cited

U.S. PATENT DOCUMENTS

| | | | |
|---|---|---|---|
| 5,819,100 A * | 10/1998 | Pearce | 713/323 |
| 6,401,214 B1 | 6/2002 | Li | 714/6 |
| 6,600,614 B1 | 7/2003 | Lenny et al. | 360/31 |
| 2001/0026416 A1 | 10/2001 | Teshigawara | 360/75 |
| 2002/0036850 A1 | 3/2002 | Lenny et al. | 360/31 |
| 2002/0036855 A1 | 3/2002 | Lenny et al. | 360/53 |
| 2002/0060868 A1 | 5/2002 | Lenny et al. | 360/31 |
| 2003/0147169 A1 | 8/2003 | Smith | 360/73.01 |
| 2003/0191889 A1 | 10/2003 | Forrer, Jr. | 711/112 |
| 2004/0051988 A1 | 3/2004 | Jing et al. | 360/31 |
| 2004/0109255 A1 | 6/2004 | Walz | 360/73.03 |
| 2004/0153689 A1 | 8/2004 | Assaf | 714/1 |

FOREIGN PATENT DOCUMENTS

| | | |
|---|---|---|
| JP | 6295519 | 10/1994 |
| JP | 2004145934 | 5/2004 |

OTHER PUBLICATIONS

Bruce Allen. "In Depth Monitoring Hard Disks with SMART," via Internet at www.acm.org, printed Aug. 5, 2004.
"PassMark DiskCheckup—Drive monitoring," via Internet at www.passmark.com, printed Aug. 5, 2004.
"Hard Disk Drives; UDMA and SMART," via Internet at www.wintrouble.net, printed Aug. 5, 2004.

* cited by examiner

*Primary Examiner*—K Wong
*Assistant Examiner*—Mitchell Slavitt
(74) *Attorney, Agent, or Firm*—Robert A. Voigt, Jr.; Winstead Sechrest & Minick P.C.; Mark E. McBurney

(57) ABSTRACT

A method, computer program product and hard disk drive for restricting a rate of spin-up/spin-down cycles for a spindle motor in a hard disk drive. The firmware in the hard disk drive determines a maximum rate of spin-up/spin-down cycles the spindle motor is designed to handle over a designated period of time based on the number of spin-up/spin-down cycles the spindle motor is designed to handle over its expected lifetime. The firmware disables the automatic standby mode of operation if a calculated rate of spin-up/spin-down cycles during the designated period of time is greater than the maximum rate of spin-up/spin-down cycles the spindle motor is designed to handle over the designated period of time. By disabling the automatic standby mode of operation, the rate of spin-up/spin-down cycles will be reduced as the spindle motor will not incur a spin-up/spin-down cycle until the automatic standby mode of operation is enabled.

27 Claims, 8 Drawing Sheets

ENSURING RATE OF SPIN-UP/SPIN-DOWN CYCLES FOR SPINDLE MOTOR IN A HARD DISK DRIVE DOES NOT EXCEED RATE SPINDLE MOTOR IS DESIGNED TO HANDLE

TECHNICAL FIELD

The present invention relates to the field of disk drive apparatuses, and more particularly to ensuring the number of spin-up/spin-down cycles for a spindle motor in a hard disk drive does not exceed the rate the spindle motor is designed to handle as well as ensuring that the duration of the spin-down cycle is not too short as well as ensuring the number of load/unload cycles for an actuator in a hard disk drive does not exceed the rate the actuator is designed to handle.

BACKGROUND INFORMATION

The most commonly used data storage means for computers are hard-disk drives (HDDs) having structures in which one or more magnetic disks are disposed coaxially and driven by a spindle motor. Data reading and writing are done by magnetic heads provided in opposition to the magnetic disks. The magnetic heads are driven by an actuator, generally a voice coil motor ("VCM"). The magnetic disks, the magnetic heads, and the actuator are stored in a housing called an enclosure case.

Typically, computer systems, including desktop and portable computers, may operate in a power saving mode of operation in order to reduce power consumption. One such power saving mode of operation may be referred to as a "standby mode." In the standby mode of operation, the display may be deactivated or turned down, the central processing unit may be operating in a lower-power mode of operation and the hard disk drive may be deactivated. A computer system may be invoked to enter a standby mode of operation after a period of inactivity, e.g., five minutes, or upon a user invoking the computer system to enter the standby mode of operation. The "sleeping" computer system may be "awakened" or resumed upon an event such as a user's keystroke, pressing the power button, receipt of electronic mail, a fax, etc. That is, upon an awakening event, the computer system exits out of the standby mode of operation and resumes a normal mode of operation.

As stated above, when the computer system enters a standby mode of operation, the hard disk drive becomes deactivated. When that occurs, the spindle motor is deactivated and the magnetic heads are lifted by the actuator to be "parked" outside of the stack of one or more magnetic disks onto a "ramp". This may be referred to herein as a "spin-down" cycle. When the computer system resumes the normal mode of operation, the spindle motor is activated and the magnetic heads are lifted by the actuator to be moved from the ramp to the stack of one or more magnetic disks. This may be referred to herein as a "spin-up" cycle.

The spindle motor may be designed to handle a certain number of spin-up/spin-down cycles over the lifetime of the spindle motor. If a computer system is repeatedly entering and exiting to and from the standby mode of operation, it may be possible that the number of spin-up/spin-down cycles may exceed the number of spin-up/spin-down cycles the spindle motor is designed to handle over its lifetime.

Therefore, there is a need in the art to ensure that the number of spin-up/spin-down cycles for a spindle motor in a hard disk drive does not exceed the rate the spindle motor is designed to handle.

Furthermore, the computer system may enter and exit the standby mode of operation in a rather short period of time. Applications that have low, but very repetitive access patterns, may invoke the computer system to reenter the normal mode of operation just after entering the standby mode of operation. For example, an anti-virus application operating on the computer system may issue a command just after the computer system enters the standby mode of operation. This command will then awaken the computer system to enter the normal mode of operation. Quickly exiting the standby mode of operation to resume a normal mode of operation may produce a lot of stress on the spindle motor. Spindle motors may be fluid dynamic bearing motors which utilize a viscous oil rather than metal ball bearings. By quickly exiting the standby mode of operation to resume the normal mode of operation, a "cavitation" may form in the viscous oil thereby causing the oil to not be smoothly uniform which may lead to mechanical friction which increases wear on the spindle motor. Hence, by having many short spin-up/spin-down cycles, the spindle motor may wear out faster than designed due to the cavitations formed in the viscous oil.

Therefore, there is a need in the art to ensure that the duration of the spin-down cycle is not too short thereby reducing, at least in part, excessive wear on the spindle motor.

Furthermore, computer systems may enter another power saving mode of operation commonly referred to as "low power idle" state. In the "low power idle" state of operation, the processor operates in a lower-power mode of operation. Furthermore, during the low power idle state of operation, the magnetic heads are parked onto a ramp as in the standby mode of operation. However, during the low power idle state of operation, the spindle motor continues to spin. As stated above, the spindle motor becomes deactivated, i.e., stops spinning, during the standby mode of operation.

A computer system may enter the low power idle state after a shorter period of inactivity than required for the computer system to enter the standby mode of operation as described above. For example, if the computer system is idle for 30 seconds, then the computer system may enter the low power idle state of operation. If the computer system continues to be idle for five minutes, then the computer system enters the standby mode of operation.

As stated above, during the lower power idle state of operation, the magnetic heads are parked onto the ramp. This may be referred to herein as a "unload" cycle. When the computer system resumes the normal mode of operation, the magnetic heads are lifted by the actuator to be moved from the ramp to the stack of one or more magnetic disks. This may be referred to herein as a "load" cycle.

The actuator may be designed to handle a certain number of load/unload cycles, e.g., 300,000 load/unload cycles, over the lifetime of the actuator. If a computer system is repeatedly entering and exiting to and from the low power idle state of operation, it may be possible that the number of load/unload cycles exceeds the number of load/unload cycles the actuator is designed to handle over its lifetime.

Therefore, there is a need in the art to ensure that the number of load/unload cycles for an actuator in a hard disk drive does not exceed the rate the actuator is designed to handle.

SUMMARY

The problems outlined above with respect to having the number of spin-up/spin-down cycles exceeding the number of spin-up/spin-down cycles the spindle motor is designed to handle may at least in part be solved in some embodiments by disabling the feature of automatically entering the standby mode of operation when the rate of spin-up/spin-down cycles exceeds the rate the spindle motor is designed to handle. The feature of automatically entering the standby mode of operation is disabled until the rate of spin-up/spin-down cycles is such that the spindle motor is designed to handle. By disabling the automatic standby mode of operation, the rate of spin-up/spin-down cycles will be reduced as the spindle motor will not incur a spin-up/spin-down cycle until the standby mode of operation is enabled.

Furthermore, the problems outlined above with respect to excessive wear of the spindle motor by having too many short spin-up/spin-down cycles may at least in part be solved by altering the amount of time a computer system needs to be inactive in order to invoke the standby mode of operation. The time may be altered such that the awakening event may occur either after the designed minimum duration of a spin-down cycle (minimum duration refers to the shortest spin-down cycle the spindle motor is designed to handle according to the manufacturer) or during the normal mode of operation. In this manner, excessive wear of the spindle motor may be reduced since the number of short spin-up/spin-down cycles may be reduced.

Furthermore, the problems outlined above with respect to having the number of load/unload cycles exceeding the number of load/unload cycles the actuator is designed to handle may at least in part be solved in some embodiments by disabling the feature of automatically entering the low power idle state of operation when the rate of load/unload cycles exceeds the rate the actuator is designed to handle. The feature of automatically entering the low power idle state of operation is disabled until the rate of load/unload cycles is such that the actuator is designed to handle. By disabling the automatic low power idle state of operation, the rate of load/unload cycles will be reduced as the actuator will not incur a load/unload cycle until the low power idle state of operation is enabled.

In one embodiment of the present invention, a method for restricting a rate of spin-up/spin-down cycles for a spindle motor in a hard disk drive may comprise the step of determining a number of spin-up/spin-down cycles the spindle motor is designed to handle over its expected lifetime. The method may further comprise determining a maximum rate of spin-up/spin-down cycles the spindle motor is designed to handle over a designated period of time using the number of spin-up/spin-down cycles the spindle motor is designed to handle over its expected lifetime. The method may further comprise calculating a rate of spin-up/spin-down cycles while the hard disk drive is activated during the period of time. An automatic standby mode of operation is disabled if the rate of spin-up/spin-down cycles while the hard disk drive is activated during the designated period of time is greater than the maximum rate of spin-up/spin-down cycles the spindle motor is designed to handle over the designated period of time.

In one embodiment of the present invention, a method for reducing, at least in part, excessive wear on a spindle motor in a hard disk drive may comprise the step of determining a minimum duration of a spin-down cycle the spindle motor is designed to handle. The method may further comprise measuring a duration of a first spin-down cycle. The method may further comprise comparing the measured duration of the first spin-down cycle to the minimum duration. A timer is configured to control when the hard disk drive enters a standby mode of operation. If the measured duration of the first spin-down cycle is less than the minimum duration, then the timer is set to equal a default value less the minimum duration.

In one embodiment of the present invention, a method for restricting a rate of load/unload cycles for an actuator in a hard disk drive may comprise the step of determining a number of load/unload cycles the actuator is designed to handle over its expected lifetime. The method may further comprise determining a maximum rate of load/unload cycles the actuator is designed to handle over a designated period of time using the number of load/unload cycles the actuator is designed to handle over its expected lifetime. The method may further comprise calculating a rate of load/unload cycles while the hard disk drive is activated during the period of time. A low power idle state of operation is disabled if the rate of load/unload cycles while the hard disk drive is activated during the designated period of time is greater than the maximum rate of load/unload cycles the actuator is designed to handle over the designated period of time.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
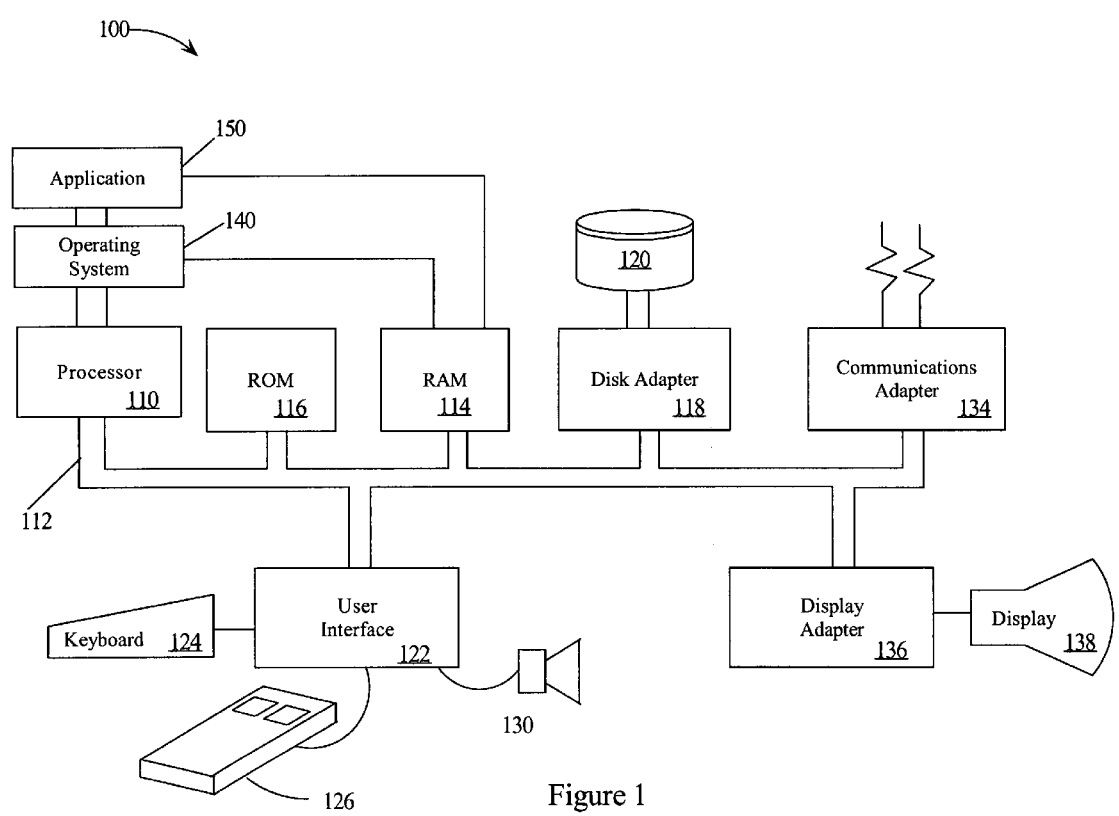
FIG. 1 illustrates a computer system in accordance with an embodiment of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not neces- FIG. 1—Computer System FIG. 1 illustrates a typical hardware configuration of a computer system 100 which is representative of a hardware environment for practicing the present invention. Referring to FIG. 1, computer system 100 may have a processor 110 coupled to various other components by a system bus 112. An operating system 140, may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150.

Read only memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114 which may be computer system's 100 main memory. Disk adapter 118 may be an integrated drive electronics ("IDE") adapter that communicates with a disk unit 120, e.g., disk drive. A description of an embodiment of disk unit 120 is provided below in association with FIG. 2.

Referring to FIG. 1, communications adapter 134 may also be coupled to system bus 112. Communications adapter 134 may interconnect bus 112 with an outside network enabling computer system 100 to communicate with other like systems. Input/Output devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138 or speaker 130.

Figure 2:
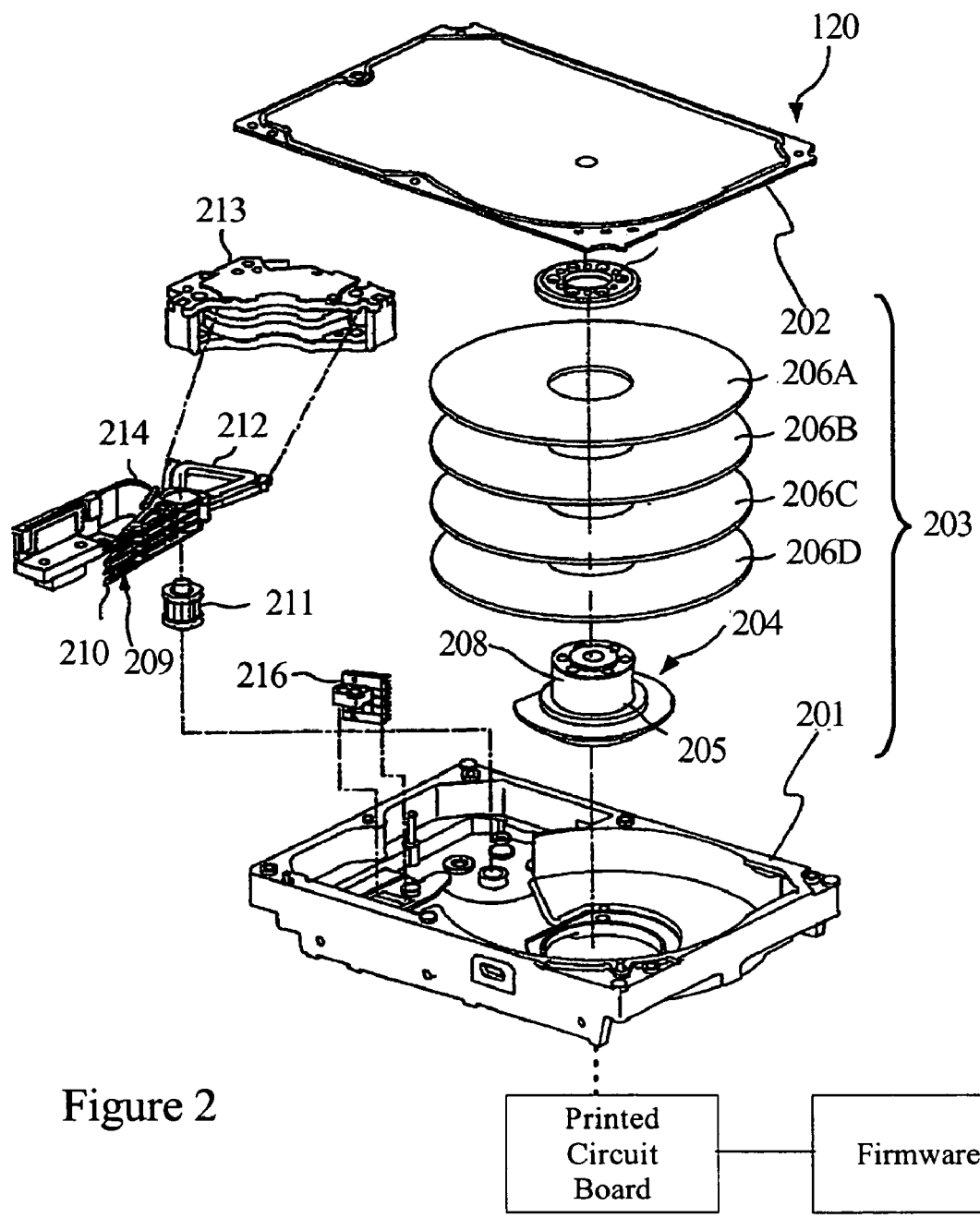
FIG. 2 illustrates an embodiment of the present invention of a hard disk drive.

FIG. 2—Hard Disk Drive

FIG. 2 illustrates an exploded perspective view of a hard disk drive 120 (FIG. 1) according to an embodiment of the present invention.

Referring to FIG. 2, in hard disk drive 120, the top opening of an aluminum alloy base 201 in the form of a shallow box is sealed with a top cover 202, as illustrated in FIG. 2. They form an enclosure case 203, which is in the form of a thin rectangular box and can be horizontally disposed inside computer system 100 (FIG. 1).

Top cover 202 may be screwed to a base 201 through a rectangular seal member (not shown), whereby enclosure case 203 is hermetically sealed.

Within enclosure case 203, a spindle motor 204 of hub-in structure is provided at a position slightly offset from the center of base 201 toward the edge. On the upper surface of a hub 205 of this spindle motor 204, magnetic disks 206A, 206B, 206C, and 206D, which consist of a glass or aluminum substrate, are fixedly mounted with a top clamp 207 and are driven to rotate with spindle motor 204. Magnetic disks 206A–D may collectively or individually be referred to as magnetic disks 206 or magnetic disk 206. Magnetic disks 206 are disk storage media for storing data. It is noted that hard disk drive 120 may include any number of magnetic disks 206 including a single magnetic disk 206. Hard disk drive 120 may further include a spindle 208 of spindle motor 204 which is fixed to top cover 202 by means of bolts (not shown). Thus, spindle 208 may have a double-end supported structure. Disks 206 are disposed coaxially along the axis of spindle 208. FIG. 2 further illustrates that spindle motor 204 is attached to spindle 208 for rotatably turning spindle 208 along an axis of spindle 208.

Hard disk drive 120 may further include an actuator 209 within enclosure case 203. Actuator 209 may have a magnetic head 210 and is supported at its intermediate portion on base 201 through a pivot 211. Actuator 209, therefore, is free to rotate on pivot 211. Actuator 209 is provided at the other end thereof with a voice coil motor coil 212 and is rotated by a voice coil motor 213, provided within enclosure case 203, which cooperates with voice coil motor coil 212.

Attached to the exterior surface (bottom surface) of base 201 may be a card 217, as a printed circuit board. Card 217 may be rectangular in shape and cover the exterior surface of base 201. Input and output of electric power, signals, etc., for driving motors, such as spindle motor 204, are performed between card 217 and spindle motor 204. Hence, card 217 is configured to drive spindle motor 217. In addition, input and output of electric power and signals, for power to voice coil motor coil 212, read and write operations by magnetic head 210, etc., are performed between card 217 and actuator 209. The input and output, between card 217 and actuator 209, are performed through a flexible cable (FPC) 214.

Card 217 may further be coupled to firmware 215 (software stored in a memory chip, such as an erasable programmable read only memory (EPROM)). Firmware 215 may be executed by processor 110 (FIG. 1). Firmware 215 may be configured to restrict a rate of spin-up/spin-down cycles for spindle motor 204 as discussed below in association with FIG. 4. Firmware 215 may further be configured to reduce, at least in part, excessive wear on spindle motor 204 as discussed further below in association with FIGS. 5A–C. Firmware 215 may further be configured to restrict a rate of load/unload cycles for actuator 209 as discussed further below in association with FIG. 6. Firmware may further include software, referred to herein as a "standby timer", configured to determine the amount of time, e.g., five minutes, of inactivity before computer system 100 (FIG. 1) enters a standby mode of operation, as discussed further below in association with FIGS. 5A–C.

Implementations of the invention include implementations as a computer system programmed to execute the method or methods described herein may be resident in firmware 215 as described above. The computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Referring to FIG. 2, in one embodiment, hard disk drive 102 may be what is referred to as a "head loading-unloading type". The head loading-unloading type hard disk drive 120 unloads magnetic head 210 to a save position without contacting head 210 with the magnetic disk surface, by holding actuator 209 at a ramp block 216 during non-operation. This may be referred to as an "unload cycle".

During operation, actuator 209 is driven so that magnetic head 210 is located over the magnetic disk. This may be referred to as a "load cycle".

A more detail embodiment illustrating a head loading-unloading type is provided below in association with FIG. 3.

Figure 3:
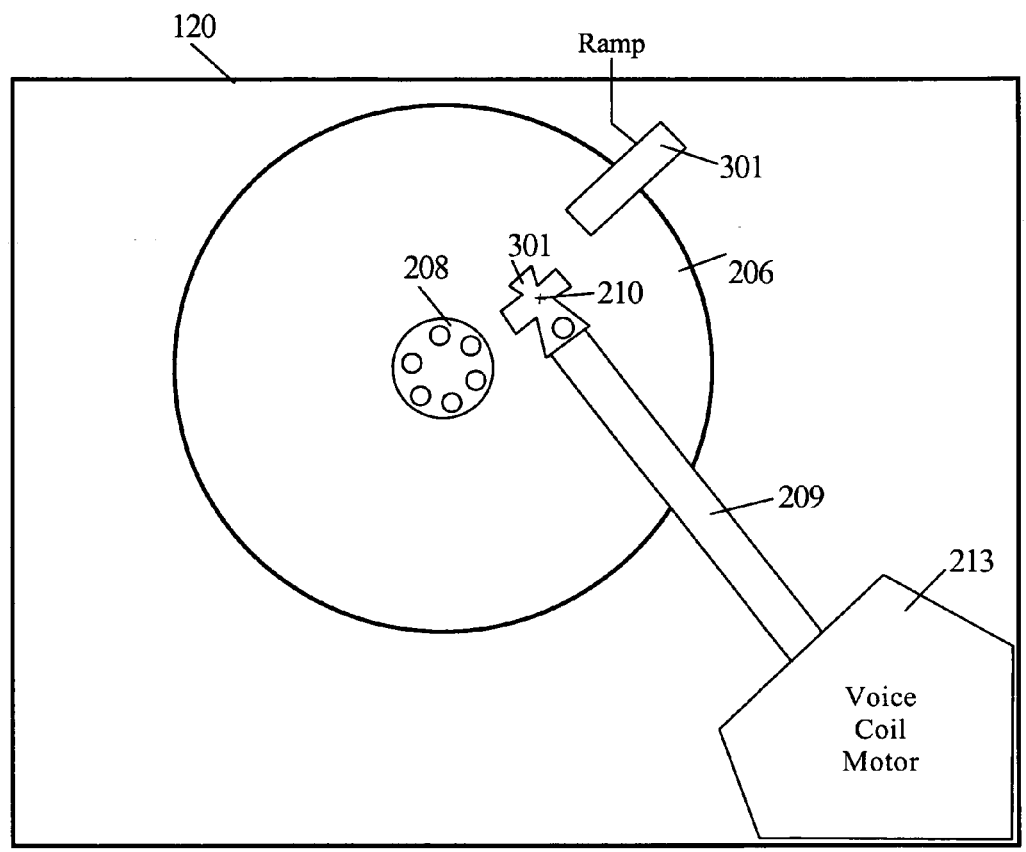
FIG. 3 is a top view of the mechanical components of the hard disk drive illustrating head loading-unloading in accordance with an embodiment of the present invention.

FIG. 3—Head Loading-Unloading

FIG. 3 illustrates a top view of the mechanical components of hard disk drive 120 (FIGS. 1–2) involved in the head loading-unloading process in accordance with an embodiment of the present invention. Referring to FIG. 3, the mechanical components may include one or more disks 206 mounted to spindle 208 driven by a spindle motor (not shown) (element 204 in FIG. 2). A ramp type load/unload mechanism is employed to lift heads 210 from each disk surface as actuator 209 (i.e., the arm that holds the read/write head) travels beyond the disks' 206 outer diameter by way of voice coil motor (VCM) 213 to park heads 210 outside of disk stack 206. At the end of each head/suspension assembly is a lift tab 301 which engages a ramp 302, i.e., an inclined cam surface positioned at the disk outer diameter. During a head loading event, head 210 is moved from ramp 301 to disk 206. During a head unloading event, head 210 is moved from disk 206 to ramp 301.

When computer system 100 (FIG. 1) enters a standby mode of operation, hard disk drive 120 becomes deactivated. When that occurs, spindle motor (not shown) (element 204 in FIG. 2) is deactivated and magnetic heads 210 are lifted by actuator 209 to be "parked" outside of the stack of one or more magnetic disks 206 onto ramp 301. This may be referred to herein as a "spin-down" cycle. When computer system 100 (FIG. 1) resumes the normal mode of operation, the spindle motor (not shown) (element 204 in FIG. 2) is activated and magnetic heads 210 are lifted by actuator 209 to be moved from ramp 301 to the stack of one or more magnetic disks 206. This may be referred to herein as a "spin-up" cycle.

Furthermore, when computer system 100 enters the lower power idle state of operation, magnetic heads 210 may be parked onto ramp 301 as described above. This may be referred to herein as a "load" cycle. When computer system 100 resumes the normal mode of operation, magnetic heads 210 are lifted by actuator 209 to be moved from ramp 301 to the stack of one or more magnetic disks 206. This may be referred to herein as an "unload" cycle.

As stated in the Background Information section, the spindle motor may be designed to handle a certain number of spin-up/spin-down cycles over the lifetime of the spindle motor. If a computer system is repeatedly entering and exiting to and from the standby mode of operation, it may be possible that the number of spin-up/spin-down cycles may exceed the number of spin-up/spin-down cycles the spindle motor is designed to handle over its lifetime. Therefore, there is a need in the art to ensure that the number of spin-up/spin-down cycles for a spindle motor in a hard disk drive does not exceed the rate the spindle motor is designed to handle. A method for restricting a rate of spin-up/spin-down cycles for a spindle motor thereby ensuring, at least in part, that the number of spin-up/spin-down cycles for a spindle motor does not exceed the rate the spindle motor is designed to handle is described below in association with FIG. 4.

Figure 4:
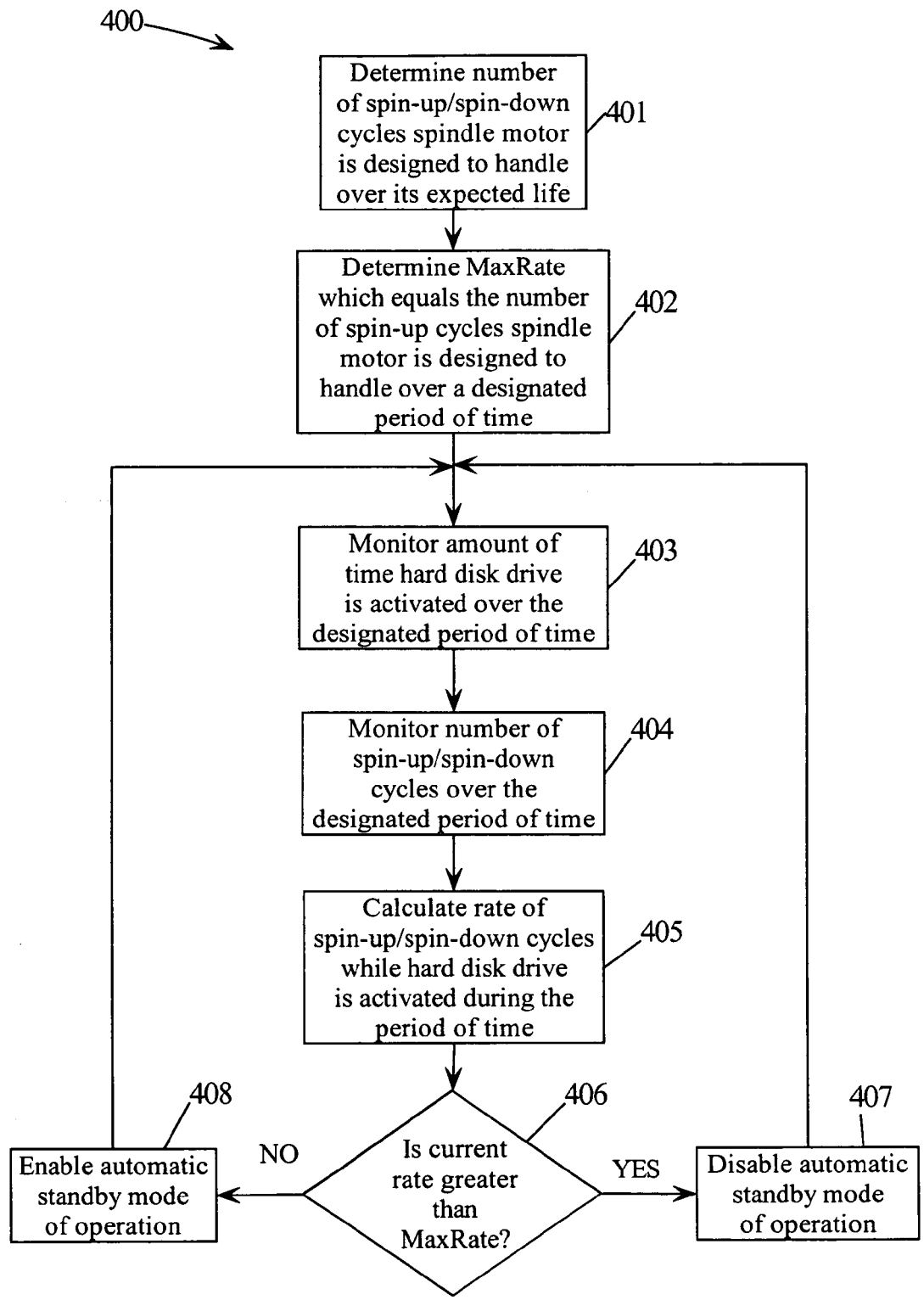
FIG. 4 is a flowchart of a method for restricting a rate of spin-up/spin-down cycles for a spindle motor in a hard disk drive in accordance with an embodiment of the present invention.

FIG. 4—Method for Restricting a Rate of Spin-Up/Spin-Down Cycles for a Spindle Motor in a Hard Disk Drive FIG. 4 is a flowchart of one embodiment of the present invention of a method 400 for restricting a rate of spin-up/spin-down cycles for spindle motor 204 (FIG. 2) in hard disk drive 120 (FIGS. 1–3).

Referring to FIG. 4, in conjunction with FIGS. 1–3, in step 401, the design manufacturer of spindle motor 204 determines the number of spin-up/spin-down cycles spindle motor 204 is designed to handle over its expected lifetime.

In step 402, firmware 215 determines a maximum number of spin-up/spin-down cycles spindle motor 204 is designed to handle over a designated period of time, e.g., 8 hours. The maximum number of spin-up/spin-down cycles spindle motor 204 is designed to handle over a designated period of time is referred to herein in the description of FIG. 4 as the "maximum rate" (MaxRate).

In step 403, firmware 215 monitors the amount of time hard disk drive 120 is activated over the designated period of time. In step 404, firmware 215 monitors the number of spin-up/spin-down cycles over the designated period of time.

In step 405, firmware 215 calculates the rate of spin-up/spin-down cycles while hard disk drive 120 is activated during the period of time.

In step 406, firmware 215 determines whether the rate calculated in step 405 is greater than the MaxRate. If so, then firmware 215 disables the automatic standby mode of operation in step 407. That is, firmware 215 disables hard disk drive 120 from entering the standby mode of operation when computer system 100 is invoked to enter the standby mode of operation. Firmware 215 disables hard disk drive 120 from entering the standby mode of operation when the rate calculated in step 405 is greater than the MaxRate since that indicates that the rate of spin-up/spin-down cycles is exceeding the rate that spindle motor 204 is designed to handle. By disabling the automatic standby mode of operation, the rate of spin-up/spin-down cycles will be reduced as spindle motor 204 will not incur a spin-up/spin-down cycle as hard disk drive 120 is disabled from entering the standby mode of operation.

If, however, the rate calculated in step 405 is not greater than the MaxRate, then, in step 408, firmware 215 enables the automatic standby mode of operation. That is, firmware 215 enables hard disk drive 120 to enter the standby mode of operation when computer system 100 is invoked to enter the standby mode of operation. Firmware 215 enables hard disk drive 120 to enter the standby mode of operation when the rate calculated in step 405 is not greater than the MaxRate since that indicates that the rate of spin-up/spin-down cycles is not exceeding the rate that spindle motor 204 is designed to handle.

It is noted that method 400 may include other and/or additional steps that, for clarity, are not depicted. It is further noted that method 400 may be executed in a different order presented and that the order presented in the discussion of FIG. 4 is illustrative. It is further noted that certain steps in method 400 may be executed in a substantially simultaneous manner.

As stated in the Background Information section, the computer system may enter and exit the standby mode of operation in a rather short period of time. Applications that have low, but very repetitive access patterns, may invoke the computer system to reenter the normal mode of operation just after entering the standby mode of operation. For example, an anti-virus application operating on the computer system may issue a command just after the computer system enters the standby mode of operation. This command will then awaken the computer system to enter the normal mode of operation. Quickly exiting the standby mode of operation to resume a normal mode of operation may produce a lot of stress on the spindle motor. Spindle motors may be fluid dynamic bearing motors which utilize a viscous oil rather than metal ball bearings. By quickly exiting the standby mode of operation to resume the normal mode of operation, a "cavitation" may form in the viscous oil thereby causing the oil to not be smoothly uniform which may lead to mechanical friction which increases wear on the spindle motor. Hence, by having many short spin-up/spin-down cycles, the spindle motor may wear out faster than designed due to the cavitations formed in the viscous oil. Therefore, there is a need in the art to ensure that the duration of the spin-down cycle is not too short thereby reducing, at least in part, excessive wear on the spindle motor. A method of reducing, at least in part, excessive wear on spindle motor 204 (FIG. 2), is described below in association with FIGS. 5A–C.

Figure 5A:
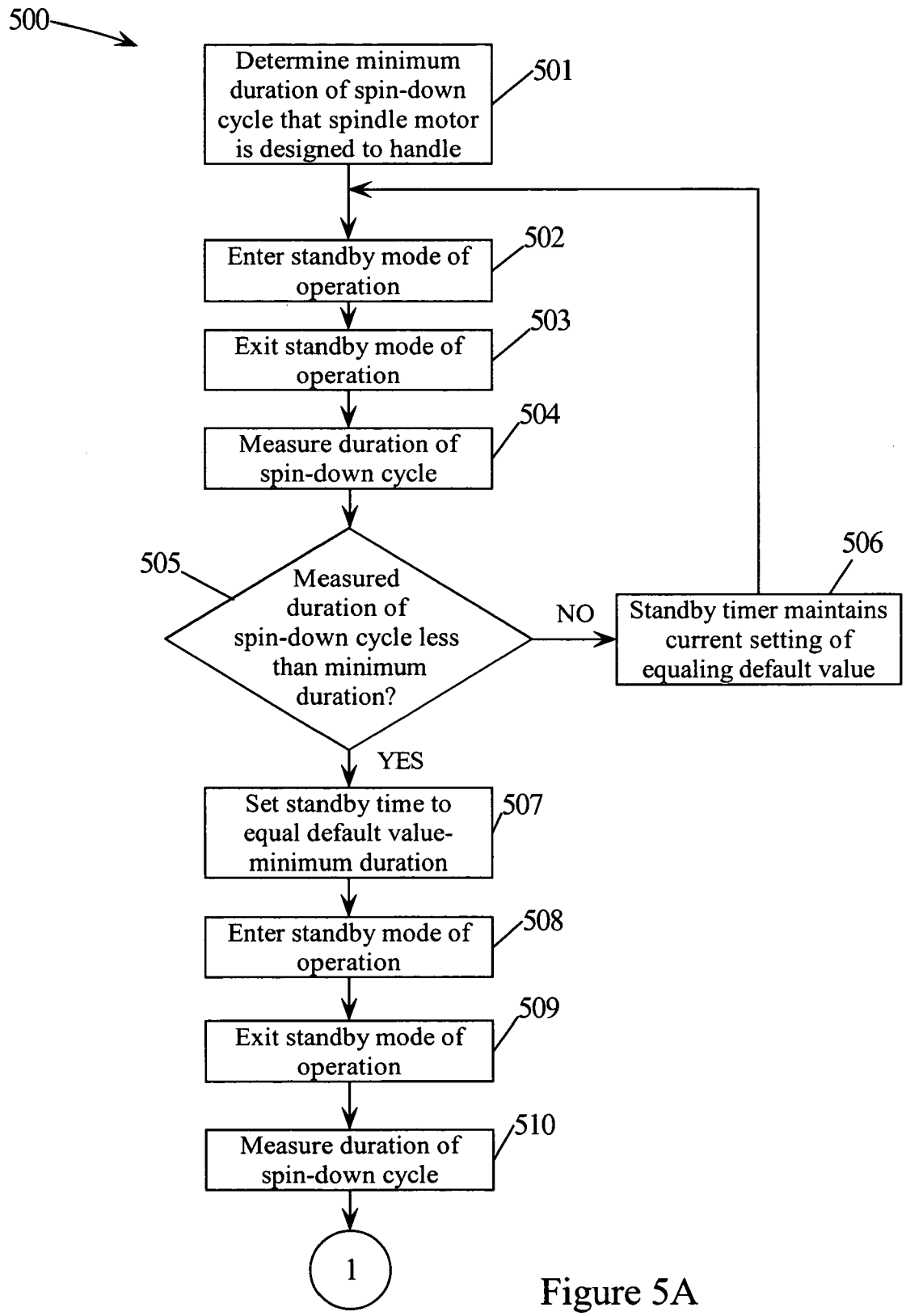
FIGS. 5A–C are a flowchart of a method for reducing, at least in part, excessive wear on a spindle motor in a hard disk drive in accordance with an embodiment of the present invention.
Figure 5B:
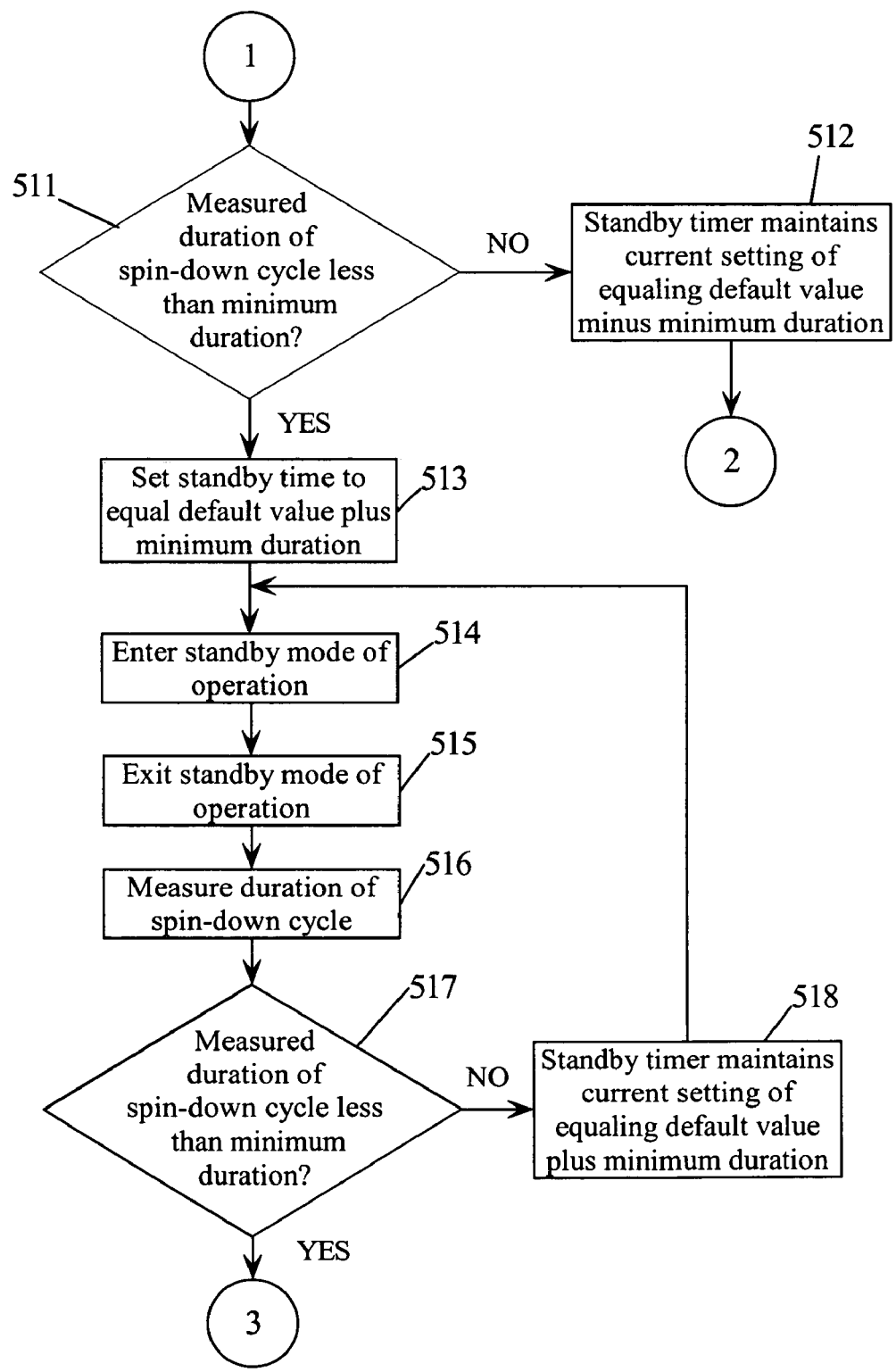
Figure 5C:
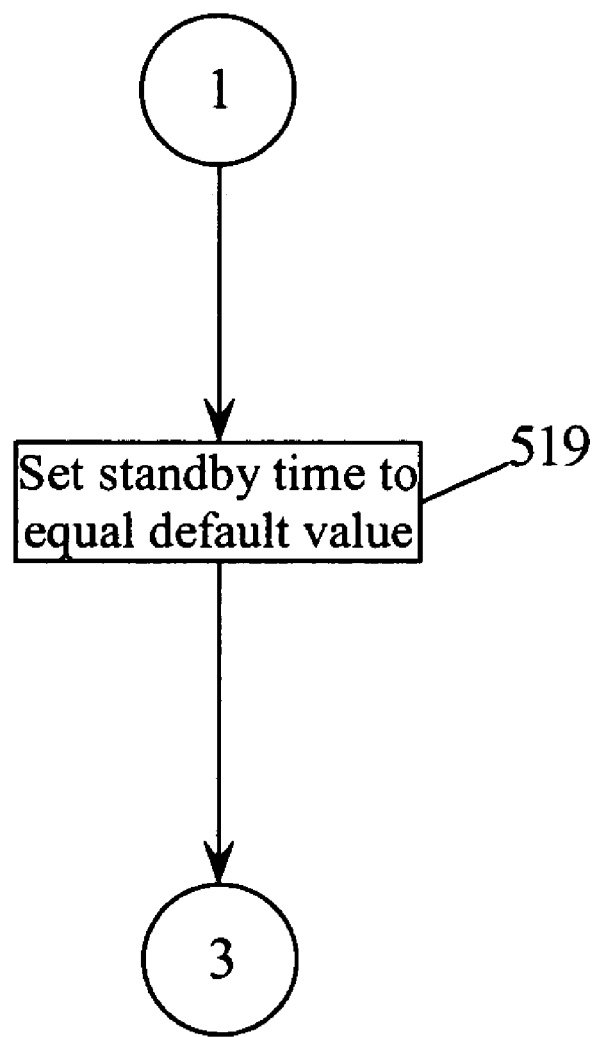

FIGS. 5A–C—Method for Reducing at Least in Part, Excessive Wear on a Spindle Motor in a Hard Disk Drive FIGS. 5A–C are a flowchart of one embodiment of the present invention of a method 500 for reducing, at least in part, excessive wear on spindle motor 204 (FIG. 2) in hard disk drive 120 (FIGS. 1–3).

Referring to FIG. 5A, in conjunction with FIGS. 1–3, in step 501, the design manufacturer of spindle motor 204 determines the duration of the spin-down cycle that spindle motor 204 is designed to handle. The duration of the spin-down cycle that spindle motor 204 is designed to handle is referred to herein in the description of FIGS. 5A–C as the "minimum duration".

In step 502, computer system 100 enters a standby mode of operation. As stated above, when computer system 100 enters a standby mode of operation, hard disk drive 120 enters the "spin-down" cycle. During the spin-down cycle, spindle motor 204 is deactivated and magnetic heads 210 are lifted by actuator 209 to be "parked" outside of the stack of one or more magnetic disks 206 onto ramp 301. In step 503, computer system 100 exits the standby mode of operation and enters the normal mode of operation. The spin-down cycle ends when computer system 100 exits the standby mode of operation and enters the normal mode of operation.

In step 504, firmware 215 measures the duration of the spin-down cycle, as discussed above in connection with steps 502–503.

In step 505, firmware 215 determines whether the measured duration of the spin-down cycle in step 504 is less than the minimum duration. If the measured duration of the spin-down cycle in step 504 is not less than the minimum duration, then, in step 506 the standby timer maintains its current setting of equaling the default value, e.g., five minutes. Computer system 100 reenters the standby mode of operation in step 502 when computer system 100 is subsequently invoked to enter the standby mode of operation.

If, however, the measured duration of the spin-down cycle in step 504 is less than the minimum duration, then, in step 507, firmware 215 sets the standby timer to equal the default value less the minimum duration. For example, if the default value is set at five minutes and the minimum duration is 30 seconds, then the standby timer is set to equal 4 minutes and 30 seconds. By changing the standby timer to have a shorter time until computer system 100 reenters the standby mode of operation, the possibility of computer system 100 awakening prior to the minimum duration during the standby mode of operation may be reduced. For example, an application may have issued a command at five minutes and 10 seconds when the standby timer was set to five minutes. When that occurred, computer system 100 was awakened prior to the minimum duration (30 seconds). However, if the standby timer were now set to equal 4 minutes and 30 seconds as mentioned above, then if the application issued a command again at 5 minutes and 10 seconds, computer system 100 would be awakened after 40 seconds being in the standby mode of operation which exceeds the minimum duration of 30 seconds.

In step 508, computer system 100 reenters the standby mode of operation when computer system 100 is subsequently invoked to enter the standby mode of operation. In step 509, computer system 100 exits the standby mode of operation and enters the normal mode of operation. In step 510, firmware 215 measures the duration of the spin-down cycle in connection with steps 508–509.

Referring to FIG. 5B, in conjunction with FIGS. 1–3, in step 511, firmware 215 determines whether the measured duration of the spin-down cycle in step 510 (FIG. 5A) is less than the minimum duration. If the measured duration of the spin-down cycle in step 510 is not less than the minimum duration, then, in step 512 the standby timer maintains its current setting of equaling the default value minus the minimum duration, e.g., four minutes and thirty seconds. Computer system 100 reenters the standby mode of operation in step 508 (FIG. 5A) when computer system 100 is subsequently invoked to enter the standby mode of operation.

If, however, the measured duration of the spin-down cycle in step 510 is less than the minimum duration, then, in step 513, firmware 215 sets the standby timer to equal the default value plus the minimum duration. For example, if the default value is set at five minutes and the minimum duration is 30 seconds, then the standby timer is set to equal 5 minutes and 30 seconds. By changing the standby timer to have a longer time until computer system 100 reenters the standby mode of operation, the possibility of computer system 100 awakening prior to the minimum duration during the standby mode of operation may be reduced. For example, an application may have issued a command at four minutes and 40 seconds when the standby timer was set to four minutes and 30 seconds. When that occurred, computer system 100 was awakened prior to the minimum duration (30 seconds). However, if the standby timer were now set to equal 5 minutes and 30 seconds as mentioned above, then if the application issued a command again at 4 minutes and 40 seconds, computer system 100 would not enter the standby mode of operation thereby preventing computer system 100 from being awakened in the standby mode of operation too early.

In step 514, computer system 100 reenters the standby mode of operation when computer system 100 is subsequently invoked to enter the standby mode of operation. In step 515, computer system 100 exits the standby mode of operation and enters the normal mode of operation. In step 516, firmware 215 measures the duration of the spin-down cycle in connection with steps 514–515.

In step 517, firmware 215 determines whether the measured duration of the spin-down cycle in step 516 is less than the minimum duration. If the measured duration of the spin-down cycle in step 516 is not less than the minimum duration, then, in step 518 the standby timer maintains its current setting of equaling the default value plus the minimum duration, e.g., five minutes and thirty seconds. Computer system 100 reenters the standby mode of operation in step 514 when computer system 100 is subsequently invoked to enter the standby mode of operation.

Referring to FIG. 5C, in conjunction with FIGS. 1–3, if, however, the measured duration of the spin-down cycle in step 516 (FIG. 5B) is less than the minimum duration, then, in step 519, firmware 215 sets the standby timer to equal the default value. For example, if the default value is set at five minutes, then the standby timer is set to equal 5 minutes. By changing the standby timer to have a shorter time until computer system 100 reenters the standby mode of operation, the possibility of computer system 100 awakening prior to the minimum duration during the standby mode of operation may be reduced. For example, an application may have issued a command at five minutes and 40 seconds when the standby timer was set to five minutes and 30 seconds. When that occurred, computer system 100 was awakened prior to the minimum duration (30 seconds). However, if the standby timer were now set to equal 5 minutes as mentioned above, then if the application issued a command again at 5 minutes and 40 seconds, computer system 100 would be awakened after 40 seconds being in the standby mode of operation which exceeds the minimum duration of 30 seconds.

Computer system 100 reenters the standby mode of operation in step 502 (FIG. 5A) when computer system 100 is subsequently invoked to enter the standby mode of operation.

It is noted that method 500 may include other and/or additional steps that, for clarity, are not depicted. It is further noted that method 500 may be executed in a different order presented and that the order presented in the discussion of FIGS. 5A–C is illustrative. It is further noted that certain steps in method 500 may be executed in a substantially simultaneous manner.

As stated in the Background Information section, the actuator may be designed to handle a certain number of load/unload cycles, e.g., 300,000 load/unload cycles, over the lifetime of the actuator. If a computer system is repeatedly entering and exiting to and from the low power idle state of operation, it may be possible that the number of load/unload cycles exceeds the number of load/unload cycles the actuator is designed to handle over its lifetime. Therefore, there is a need in the art to ensure that the number of load/unload cycles for an actuator in a hard disk drive does not exceed the rate the actuator is designed to handle. A method for restricting a rate of load/unload cycles for an actuator in a hard disk drive is described below in association with FIG. 6.

Figure 6:
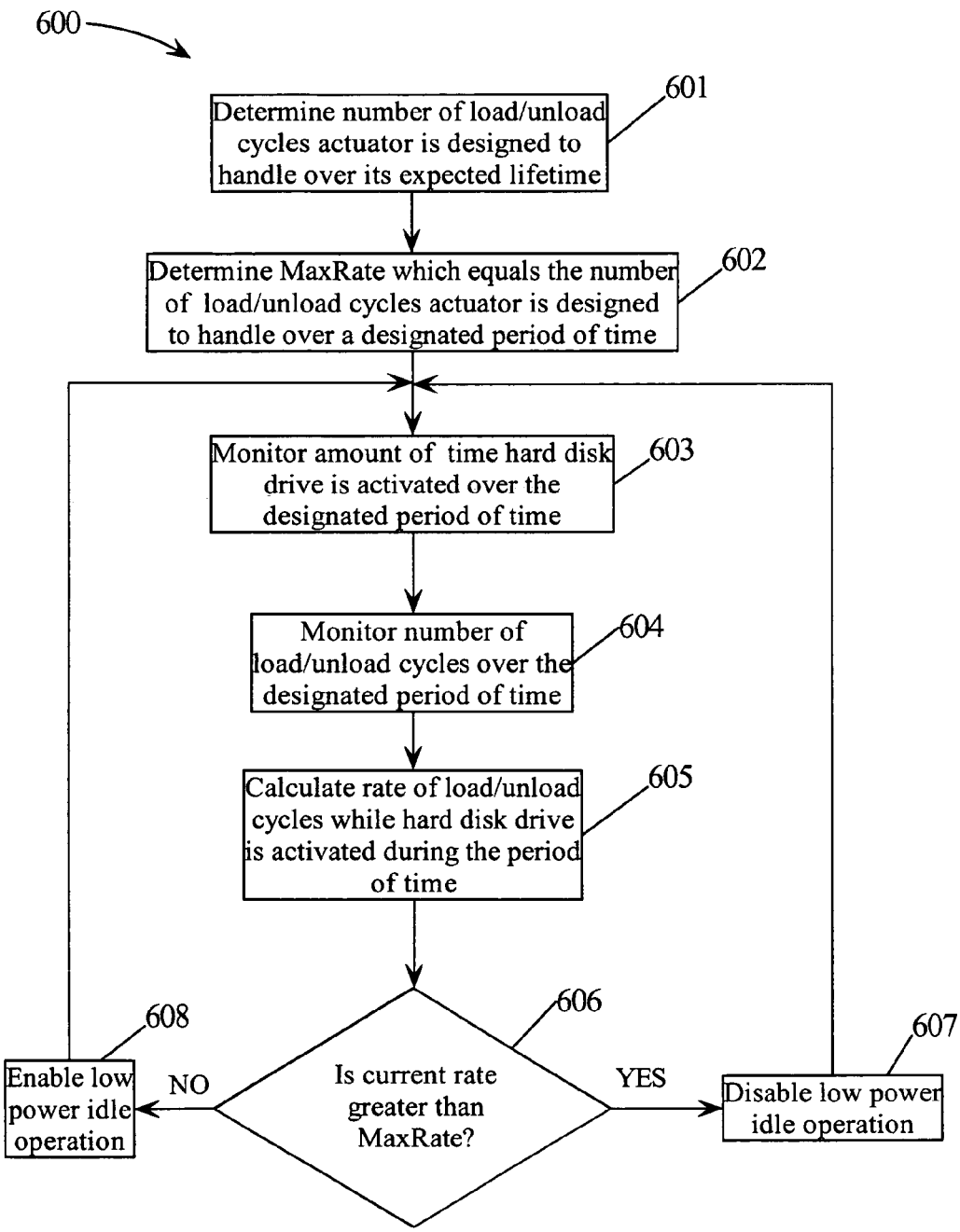
FIG. 6 is a flowchart of a method for restricting a rate of load/unload cycles for an actuator in a hard disk drive in accordance with an embodiment of the present invention.

FIG. 6—Method for Restricting a Rate of Load/Unload Cycles for an Actuator in a Hard Disk Drive FIG. 6 is a flowchart of one embodiment of the present invention of a method 600 for restricting a rate of load/unload cycles for actuator 209 (FIGS. 2–3) in hard disk drive 120 (FIGS. 1–3).

Referring to FIG. 6, in conjunction with FIGS. 1–3, in step 601, the design manufacturer of actuator 209 determines the number of load/unload cycles actuator 209 is designed to handle over its expected lifetime.

In step 602, firmware 215 determines a maximum number of load/unload cycles actuator 209 is designed to handle over a designated period of time, e.g., 8 hours. The maximum number of load/unload cycles actuator 209 is designed to handle over a designated period of time is referred to herein in the description of FIG. 6 as the "maximum rate" (MaxRate).

In step 603, firmware 215 monitors the amount of time hard disk drive 120 is activated over the designated period of time. In step 604, firmware 215 monitors the number of load/unload cycles over the designated period of time.

In step 605, firmware 215 calculates the rate of load/unload cycles while hard disk drive 120 is activated during the period of time.

In step 606, firmware 215 determines whether the rate calculated in step 605 is greater than the MaxRate. If so, then firmware 215 disables the low power idle state of operation in step 607. That is, firmware 215 disables hard disk drive 120 from entering the low power idle state of operation when computer system 100 is invoked to enter the low power idle state of operation. Firmware 215 disables hard disk drive 120 from entering the low power idle state of operation when the rate calculated in step 605 is greater than the MaxRate since that indicates that the rate of load/unload cycles is exceeding the rate that actuator 209 is designed to handle. By disabling the automatic low power idle state of operation, the rate of load/unload cycles will be reduced as actuator 209 will not incur a load/unload cycle as hard disk drive 120 is disabled from entering the low power idle state of operation.

If, however, the rate calculated in step 605 is not greater than the MaxRate, then, in step 608, firmware 215 enables the automatic low power idle state of operation. That is, firmware 215 enables hard disk drive 120 to enter the low power idle state of operation when computer system 100 is invoked to enter the low power idle state of operation. Firmware 215 enables hard disk drive 120 to enter the low power idle state of operation when the rate calculated in step 605 is not greater than the MaxRate since that indicates that the rate of load/unload cycles is not exceeding the rate that actuator 209 is designed to handle.

It is noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

Although the method, computer program product and hard disk drive are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for restricting a rate of spin-up/spin-down cycles for a spindle motor in a hard disk drive comprising the steps of:
  determining a number of spin-up/spin-down cycles said spindle motor is designed to handle over its expected lifetime;
  determining a maximum rate of spin-up/spin-down cycles said spindle motor is designed to handle over a designated period of time using said number of spin-up/spin-down cycles said spindle motor is designed to handle over its expected lifetime; and
  calculating a rate of spin-up/spin-down cycles while said hard disk drive is activated during said period of time;
  wherein an automatic standby mode of operation is disabled if said rate of spin-up/spin-down cycles while said hard disk drive is activated during said designated period of time is greater than said maximum rate of spin-up/spin-down cycles said spindle motor is designed to handle over said designated period of time.

2. The method as recited in claim 1 further comprising the steps of:
monitoring an amount of time said hard disk drive is activated over said designated period of time; and
monitoring a number of spin-up/spin-down cycles over said designated period of time.

3. The method as recited in claim 2, wherein said rate of spin-up/spin-down cycles while said hard disk drive is activated during said period of time is calculated using said number of spin-up/spin-down cycles over said designated period of time and said amount of time said hard disk drive is activated over said designated period of time.

4. A computer program product embodied in a machine readable medium for restricting a rate of spin-up/spin-down cycles for a spindle motor in a hard disk drive comprising the programming steps of:
determining a number of spin-up/spin-down cycles said spindle motor is designed to handle over its expected lifetime;
determining a maximum rate of spin-up/spin-down cycles said spindle motor is designed to handle over a designated period of time using said number of spin-up/spin-down cycles said spindle motor is designed to handle over its expected lifetime; and
calculating a rate of spin-up/spin-down cycles while said hard disk drive is activated during said period of time;
wherein an automatic standby mode of operation is disabled if said rate of spin-up/spin-down cycles while said hard disk drive is activated during said designated period of time is greater than said maximum rate of spin-up/spin-down cycles said spindle motor is designed to handle over said designated period of time.

5. The computer program product as recited in claim 4 further comprising the programming steps of:
monitoring an amount of time said hard disk drive is activated over said designated period of time; and
monitoring a number of spin-up/spin-down cycles over said designated period of time.

6. The computer program product as recited in claim 5, wherein said rate of spin-up/spin-down cycles while said hard disk drive is activated during said period of time is calculated using said number of spin-up/spin-down cycles over said designated period of time and said amount of time said hard disk drive is activated over said designated period of time.

7. A hard disk drive comprising:
a spindle;
a spindle motor attached to said spindle for rotatably turning said spindle along an axis of said spindle;
one or more disk storage media disposed coaxially along said axis of said spindle;
a card coupled to said spindle motor configured to drive said spindle motor; and
a firmware coupled to said card, wherein said firmware holds software configured to perform the following steps:
determining a number of spin-up/spin-down cycles said spindle motor is designed to handle over its expected lifetime;
determining a maximum rate of spin-up/spin-down cycles said spindle motor is designed to handle over a designated period of time using said number of spin-up/spin-down cycles said spindle motor is designed to handle over its expected lifetime; and
calculating a rate of spin-up/spin-down cycles while said hard disk drive is activated during said period of time;
wherein an automatic standby mode of operation is disabled if said rate of spin-up/spin-down cycles while said hard disk drive is activated during said designated period of time is greater than said maximum rate of spin-up/spin-down cycles said spindle motor is designed to handle over said designated period of time.

8. The hard disk drive as recited in claim 7, wherein said software is further configured to perform the following steps:
monitoring an amount of time said hard disk drive is activated over said designated period of time; and
monitoring a number of spin-up/spin-down cycles over said designated period of time.

9. The hard disk drive as recited in claim 8, wherein said rate of spin-up/spin-down cycles while said hard disk drive is activated during said period of time is calculated using said number of spin-up/spin-down cycles over said designated period of time and said amount of time said hard disk drive is activated over said designated period of time.

10. A method for reducing, at least in part, excessive wear on a spindle motor in a hard disk drive comprising the steps of:
determining a minimum duration of a spin-down cycle said spindle motor is designed to handle;
measuring a duration of a first spin-down cycle; and
comparing said measured duration of said first spin-down cycle to said minimum duration;
wherein a timer is configured to control when said hard disk drive enters a standby mode of operation, wherein if said measured duration of said first spin-down cycle is less than said minimum duration, then said timer is set to equal a default value less said minimum duration.

11. The method as recited in claim 10, wherein said timer maintains a current setting of equaling said default value if said measured duration of said first spin-down cycle is not less than said minimum duration.

12. The method as recited in claim 10 further comprising the step of:
measuring a duration of a second spin-down cycle if said measured duration of said first spin-down cycle is less than said minimum duration;
wherein if said measured duration of said second spin-down cycle is less than said minimum duration, then said timer is set to equal a default value plus said minimum duration.

13. The method as recited in claim 12, wherein said timer maintains a current setting of equaling said default value less said minimum duration if said measured duration of said second spin-down cycle is not less than said minimum duration.

14. The method as recited in claim 12 further comprising the step of:
measuring a duration of a third spin-down cycle if said measured duration of said second spin-down cycle is less than said minimum duration;
wherein if said measured duration of said third spin-down cycle is less than said minimum duration, then said timer is set to equal said default value.

15. The method as recited in claim 14, wherein said timer maintains a current setting of equaling said default value plus said minimum duration if said measured duration of said third spin-down cycle is not less than said minimum duration.

16. A computer program product embodied in a machine readable medium for reducing, at least in part, excessive wear on a spindle motor in a hard disk drive comprising the programming steps of:

measuring a minimum duration of a spin-down cycle said spindle motor is designed to handle;

measuring a duration of a first spin-down cycle; and comparing said measured duration of said first spin-down cycle to said minimum duration;

wherein a timer is configured to control when said hard disk drive enters a standby mode of operation, wherein if said measured duration of said first spin-down cycle is less than said minimum duration, then said timer is set to equal a default value less said minimum duration.

17. The computer program product as recited in claim 16, wherein said timer maintains a current setting of equaling said default value if said measured duration of said first spin-down cycle is not less than said minimum duration.

18. The computer program product as recited in claim 16 further comprising the programming step of:

measuring a duration of a second spin-down cycle if said measured duration of said first spin-down cycle is less than said minimum duration;

wherein if said measured duration of said second spin-down cycle is less than said minimum duration, then said timer is set to equal a default value plus said minimum duration.

19. The computer program product as recited in claim 18, wherein said timer maintains a current setting of equaling said default value less said minimum duration if said measured duration of said second spin-down cycle is not less than said minimum duration.

20. The computer program product as recited in claim 18 further comprising the programming step of:

measuring a duration of a third spin-down cycle if said measured duration of said second spin-down cycle is less than said minimum duration;

wherein if said measured duration of said third spin-down cycle is less than said minimum duration, then said timer is set to equal said default value.

21. The computer program product as recited in claim 20, wherein said timer maintains a current setting of equaling said default value plus said minimum duration if said measured duration of said third spin-down cycle is not less than said minimum duration.

22. A hard disk drive comprising:

a spindle;

a spindle motor attached to said spindle for rotatably turning said spindle along an axis of said spindle;

one or more disk storage media disposed coaxially along said axis of said spindle;

a card coupled to said spindle motor configured to drive said spindle motor; and a firmware coupled to said card, wherein said firmware holds software configured to perform the following steps:

determining a minimum duration of a spin-down cycle said spindle motor is designed to handle;

measuring a duration of a first spin-down cycle; and comparing said measured duration of said first spin-down cycle to said minimum duration;

wherein a timer is configured to control when said hard disk drive enters a standby mode of operation, wherein if said measured duration of said first spin-down cycle is less than said minimum duration, then said timer is set to equal a default value less said minimum duration.

23. The hard disk drive as recited in claim 22, wherein said timer maintains a current setting of equaling said default value if said measured duration of first said spin-down cycle is not less than said minimum duration.

24. The hard disk drive as recited in claim 22, wherein said software is further configured to perform the following step:

measuring a duration of a second spin-down cycle if said measured duration of said first spin-down cycle is less than said minimum duration;

wherein if said measured duration of said second spin-down cycle is less than said minimum duration, then said timer is set to equal a default value plus said minimum duration.

25. The hard disk drive as recited in claim 24, wherein said timer maintains a current setting of equaling said default value less said minimum duration if said measured duration of said second spin-down cycle is not less than said minimum duration.

26. The hard disk drive as recited in claim 24, wherein said software is further configured to perform the following step:

measuring a duration of a third spin-down cycle if said measured duration of said second spin-down cycle is less than said minimum duration;

wherein if said measured duration of said third spin-down cycle is less than said minimum duration, then said timer is set to equal said default value.

27. The hard disk drive as recited in claim 26, wherein said timer maintains a current setting of equaling said default value plus said minimum duration if said measured duration of said third spin-down cycle is not less than said minimum duration.

* * * * *